April 25, 1961 | E. H. TURNER | 2,981,906
RESISTANCE SHEET MICROWAVE DEVICE
Filed Oct. 14, 1957
FIG. 1
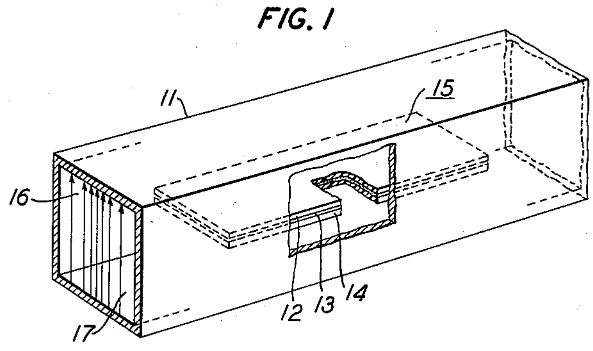
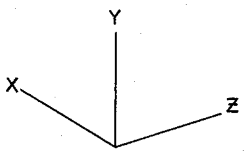
FIG. 2
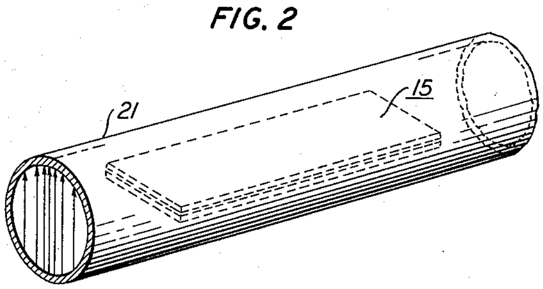
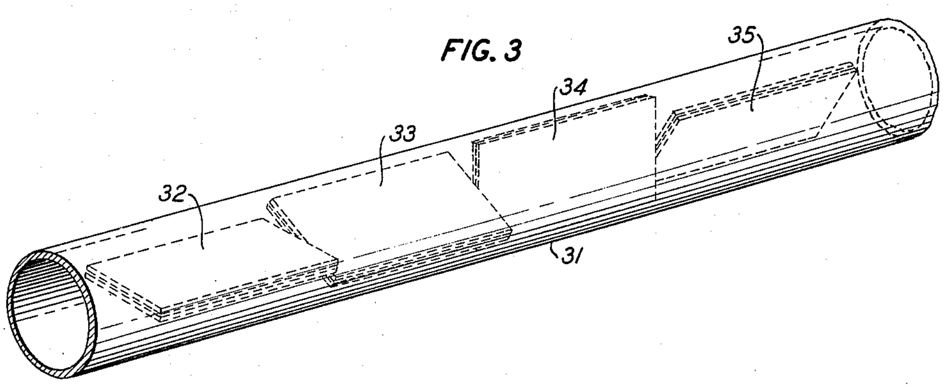
FIG. 3
INVENTOR
E. H. TURNER
BY Roy M. Porter Jr.
ATTORNEY

United States Patent Office 2,981,906

Patented Apr. 25, 1961

2,981,906

RESISTANCE SHEET MICROWAVE DEVICE

Edward H. Turner, Middletown, N.J., assignor to Bell Telephone Laboratories, Incorporated, New York, N.Y., a corporation of New York Filed Oct. 14, 1957, Ser. No. 689,950

3 Claims. (Cl. 333—81)

This invention relates to microwave transmission systems and more particularly to resistance sheet mode filters for discriminating between electromagnetic modes which may be propagated in such systems.

Resistance sheet filters generally comprise a thin planar sheet of material which dissipates energy in the form of conduction currents induced in the sheet by an electromagnetic wave. The resistive portion of the sheet is either composed of nonmetallic lossy material such as carbon black or a thin film of metallic material such as cobalt which will offer high loss to the flow of conduction currents. The resistance sheet filter functions to substantially completely attenuate wave energy having a particular electric field configuration while permitting wave energy of other electric field patterns to pass substantially undisturbed.

In general, the plane of the resistance sheet is disposed longitudinally within a wave guide, parallel to the direction of propagation of wave energy, and in this arrangement is utilized to discriminate between a given transverse electric mode and other mode configurations. Thus, modes having electric field components parallel or tangential to the plane of the resistance sheet are attenuated since these electric field components induce conduction currents in the lossy material. Transverse electric modes whose electric field components are normal to the plane of the resistance sheet, however, will as a general consideration be attenuated only slightly since the resistance sheet constitutes a substantially equipotential surface in the electric field. In this way, for example, two orthogonally polarized transversed electric waves may be readily separated. By having the plane of the resistance sheet filter parallel to the plane of polarization of one of the linearly polarized waves, that mode will be substantially completely attenuated while the mode having its plane of polarization orthogonal thereto will pass the resistance sheet substantially unaffected. In the discussion that follows, an electromagnetic mode whose electric field is parallel or tangential to the resistance sheet will be referred to as a "tangential mode," while a mode having electric field components solely normal to the resistance sheet in the region wherein the sheet is located will be referred to as an "orthogonal mode." Furthermore, the direction of electric field components in the wave guide will always be with reference to the plane of the resistance sheet.

The effectiveness and efficiency of resistance sheet mode filters depend substantially upon two factors. The first is the completeness by which the tangential mode is attenuated, i.e., how great the insertion loss for the tangential mode. The second is the extent to which the orthogonal mode is left unattenuated, i.e., how small the insertion loss for the orthogonal mode. The first factor presents little problem since one must merely insure that the resistivity per quare exhibited by the resistance sheet is sufficiently high for the operating frequency (the more remote from the cut-off frequency of the wave guide, the higher the resistivity required). The second factor, however, is one which is not so readily controlled. It is to the improvement of this second factor, namely the decrease in insertion loss for the orthogonal mode, that this invention is directed. The remainder of the discussion will, therefore, be directed primarily to considering the effect of the resistance sheet filter on the orthogonal mode.

As is well known in the art, it is desirable to keep the resistance sheet as thin as possible so that the orthogonal mode will not induce conduction currents within the sheet in a direction parallel to the electric field, i.e., perpendicular to the plane of the sheet. Another reason for keeping the resistance sheet thin is that tangential conduction currents, i.e., currents parallel to the plane of the resistance sheet, may be induced if the resistance sheet is thicker than a very small fraction of a skin depth. This will be discussed further below. In any event, for either or both of these reasons it is highly advantageous to keep the resistance sheet as thin as possible in order to minimize attenuation to the orthogonal mode (while at the same time completely attenuating the tangential mode).

Ordinarily the lossy material utilized must be so thin that a sheet consisting solely of this material is not structurally self-supporting. Accordingly, a structural support is necessary. This usually takes the form of a thin vane composed of dielectric material with a thin layer of lossy material applied to one or both faces of the vane. Sometimes the lossy material is dispersed as finely powdered particles throughout the support vane itself. If the mode filter is for use in low frequency transmission systems, it is possible that a resistance sheet may be tolerated having a thickness great enough so that it is structurally self-supporting even though it consists solely of the lossy material. In those cases, the dielectric support member ordinarily is not utilized. When the wavelength of the communication system, however, is of the order of a few centimeters, or more especially in the millimeter wave region, it is mandatory that extremely thin resistance sheets be used in order to keep the attenuation of the orthogonal mode at a reasonably low figure. In these latter cases, the use of a support member is essential.

It has been found that a resistive sheet such as carbon black dissipated through a dielectric film, or carbon black coating a dielectric support member, cannot effectively be made thinner than a skin depth at these frequencies and still provide sufficient attenuation to the tangential mode. However, by evaporating a metallic film, such as cobalt, on a surface of a dielectric support member, both these conditions may be met. To provide such a metallic film of appropriate thinness places certain requirements on the material of which the support member consists. Thus it must be a reasonably nonporous, nonflowable dielectric. Unfortunately, the dielectric materials having very low dielectric constants, such as Polyfoam and Teflon for example, meet none of these requirements. Resort must be had accordingly to materials having somewhat higher dielectric constants, such as Mylar. To keep dielectric losses to the orthogonal mode at a minimum, the dielectric support member should in turn be kept as thin as possible while still performing its structural support function for the evaporated metallic film. All these factors must be satisfied if the insertion loss to the orthogonal mode is to be kept low when operating at wavelengths of a few millimeters or even centimeters.

It has been found however that the orthogonal mode will experience some attenuation due to the thin support member itself, even if provision is made for the abovementioned factors. If a wave guide is loaded with a thin sheet of dielectric material in the form of a longitudinally extending bisecting plane, the electric field configuration of the orthogonal mode will be perturbed in the region of the edge of the sheet. As a result, there will not only be perpendicular components of electric field at the surfaces of the sheet but there will also be some components tangential to the sheet. If there is a resistive film on either or both faces of the dielectric sheet, these tangential electric field components will induce conduction currents in the resistive material with a resulting undesired attenuation to the orthogonal mode. However, the electric field components tangential to the sheet at one face thereof are equal in magnitude and opposite in sense to the tangential components at the other face of the sheet. As a consequence, there is a planar region between the two faces of the sheet wherein the tangential or parallel components must be equal to zero. That is, from symmetry considerations, it can be deduced that if the electric field components at one face of the sheet are opposite in sense to those at the other face of the sheet, the electric field must reverse at some region therebetween. This region constitutes a null region of tangential electric field components. Stated another way, a sheet loading a wave guide perturbs the orthogonal mode such that tangential electric field components exist everywhere in and about the sheet except through a longitudinal plane extending parallel to and between the faces of the sheet wherein none but perpendicular electric field components exist.

In accordance with the invention, therefore, a resistive film is located solely at this planar region of null tangential electric field components. Thus, if the resistance sheet filter comprises a sheet centrally located with respect to the transverse cross section of the wave guide, the proper construction is two thin dielectric sheets or laminations with a thin lossy film located therebetween and contiguous to one face of each dielectric lamination. This entire laminal construction is then the resistance sheet filter element that is used. By placing the laminal sheet centrally within the wave guide, that is, conforming to the diametral plane in a round wave guide or the cross sectionally bisecting plane in a rectangular wave guide, the resistive film of the sheet coincides, of necessity, with the null plane of tangential electric components. As a consequence none of the tangential electric field components perturbed from the orthogonal mode will be attenuated by the resistive film since no currents can be induced therein by virtue of the null location of the film. This results in a significant reduction in the insertion loss to the orthogonal mode.

It may be seen therefore that the invention achieves the object of selectively attenuating tangential modes of wave energy propagation while reducing the attenuation to orthogonal modes to a heretofore unattainable minimum. Furthermore, a structural advantage is achieved in accordance with the invention since the thin and usually delicate resistive film is structurally protected by virtue of its being sandwiched between two dielectric laminations.

The nature of the present invention, its various objects, features and advantages will appear more fully upon consideration of the embodiments illustrated in the accompanying drawings and the following detailed description.

In the drawings:

Fig. 1 is an illustrative example of a resistance sheet mode filter in accordance with the invention utilized for dominant mode wave energy in a rectangular cross-sectioned wave guide;

Fig. 2 is an illustrative example of a resistance sheet mode filter similar to that of Fig. 1 utilized for dominant mode wave energy in a round cross-sectioned wave guide; and Fig. 3 is a transverse cross-sectional view of an example of a resistance sheet mode filter for higher order modes in a circular wave guide.

In more detail, Fig. 1 discloses a resistance sheet mode filter in accordance with the invention for selectively attenuating horizontally polarized dominant mode wave energy in a rectangular guide of square cross-section and which simultaneously passes vertically polarized dominant mode wave energy undisturbed. Wave guide 11 is of the hollow metallic pipe type having a square transverse cross-section. Guide 11 is proportioned such that vertically polarized dominant mode wave energy and horizontally polarized dominant mode wave energy may propagate therethrough simultaneously to the exclusion of higher order modes. Disposed within guide 11 is a laminal resistance sheet 15 consisting of three laminations 12, 13 and 14. Laminations 12 and 14 are support members for 13 and consist of a nonporous all-dielectric material having a dielectric constant measurably different from that of air which is the same for both laminations 12 and 14. An appropriate material of this type is Mylar. Furthermore, all the corresponding dimensions of laminations 12 and 14 are of precisely the same magnitude with the laminations being as thin as possibly consonant with performing a structural support function, in order to minimize dielectric losses. Sandwiched between laminations 12 and 14 is a thin lamination or film 13 of cobalt. Thus dielectric lamination 12 has one face contiguous to cobalt film 13, while dielectric lamination 14 has one face contiguous to the other side of cobalt film 13. Laminations 12, 13, and 14 thus form a solid laminal sheet 15 whose plane extends transversely across guide 11 from the left hand wall to the right hand wall and is disposed parallel to the top and bottom walls of guide 11 and midway therebetween. The laminal sheet 15 extends along a longitudinal interval of guide 11, thereby dividing guide 11 along this interval into two equal portions 16 and 17 above and below sheet 15, respectively. The sandwich-like construction of laminal sheet 15 may be achieved by evaporating a thin film of cobalt metal on to a dielectric lamination and then placing a similar dielectrtic lamination contiguous to the exposed cobalt film in a mirror-image relation to the first dielectric sheet so as to sandwich the cobalt film therebetween. The thin metallic film 13 has a thickness only a small fraction of a skin depth at the operating frequency and exhibits high resistance to conduction current flow.

Horizontally polarized wave energy propagating through guide 11 will be substantially completely attenuated by the lossy film 13, in manner well known in the art. Vertically polarized dominant mode wave energy propagating through the guide will, however, be substantially unaffected by resistive film 13. This is so, not only because this sheet substantially represents an equipotential surface to the vertically polarized wave energy, but additionally because of the symmetric sandwich construction surrounding resistive film 13.

In order to properly understand the operation of the embodiment of Fig. 1 let us consider how a vertically polarized wave will be affected by laminal sheet 15. The dominant $TE_{10}$ mode in a rectangular guide is a purely transverse electric mode and thus has electric field components solely in a transverse direction as indicated by the electric field vectors in the figure. When a wave front passes through that section of guide 11 containing laminal sheet 15, the dielectric discontinuities formed by the top surface of lamination 12 and the bottom surface of lamination 14 serve to perturb the electric field so that electric components are created in the longitudinal direction, i.e., the $z$ direction in the $x$-$z$ plane. Now the tangential electric field components thus created will be polarized in one sense in the $z$ direction at the top face of lamination 12 but will be of opposite polarity, at the bottom face of lamination 14.

Since the perturbed field results in tangential electric components at the top face of lamination 12 which are oppositely sensed to those at the bottom face of lamination 14, there must of necessity be a plane parallel to and intermediate these faces wherein the polarity of the tangential components reverse and thus a planar null tangential electric field exists. Furthermore, because laminal sheet 15 is exactly midway between the top and bottom of guide 11 and because dielectric laminations 12 and 14 have precisely the same thickness, shape and dielectric constant, it follows that this null planar region of tangential electric field components must lie precisely midway between the top face of lamination 12 and the bottom face of lamination 14. This corresponds precisely to the planar region wherein lossy film 13 is located. Therefore, even though laminal sheet 15 perturbs the orthogonal vertically polarized dominant mode so as to create tangential components, these components are practically unaffected by the lossy lamination 13 because of its location at a null region of longitudinal electric field components. Since lossy film 13 can be made almost infinitesimally thin by properly controlling the evaporation process forming it, film 13 is located substantially only where the perturbed electric field components from the orthogonal mode are zero. Furthermore, since the thickness of evaporated film 13 is at most a small fraction of a skin depth at the operating frequency, whatever tangential conduction currents which tend to be generated in film 13 by virtue of tangential field components of one polarity will be canceled by the oppositely sensed conduction currents which tend to be generated by the tangential field components of opposite polarity. It may be seen, therefore, that even though substantial tangential electric field components are generated by the resistance sheet filter perturbing an orthogonal mode, these components remain unattenuated, nevertheless, by virtue of the symmetric sandwich type construction utilizing a lossy film which is thin compared to a skin depth at the operating frequency.

The overall operation of the embodiment of Fig. 1 can now fully be appreciated. A tangential horizontally polarized dominant mode propagating through guide 11 is substantially completely attenuated by virtue of the resistive film 13 in which considerable conduction currents are generated. On the other hand, orthogonal vertically polarized dominant mode wave energy propagating through guide 11 is passed with practically no attenuation whatever despite the generation of tangential electric components by the field perturbation caused by laminal sheet 15.

In this symmetric construction, the null plane will be centrally located between the two outside faces of laminal sheet 15. This may be readily understood by considering that with the laminal sheet symmetrically located the tangential electric field components at opposite faces of the laminal sheet will be of equal magnitude (and as indicated above of opposite sense). If the two dielectric laminations 12 and 14, therefore, are of the same dielectric constant and have equal thicknesses throughout, the null plane must be located equidistant between the two outside faces of laminal sheet 15. If, however, it is desired to locate the laminal sheet 15 other than centrally, the magnitude of the components at the outside faces will be unequal and the null plane would not ordinarily be equidistant from the two outside faces. To have the resistive film 13 located at the null region then would require either having the two dielectric laminations 12 and 14 of different thicknesses, or having them be of different dielectric constants, or a combination of both. Any of these arrangements causes the resistive film to coincide with the null plane when these parameters are properly proportioned.

Although resistive film 13 was described as evaporated cobalt, other metals may be evaporated on to a dielectric lamination to provide the required overall resistivity.

Referring now to Fig. 2 there is disclosed an embodiment of the invention similar to that of Fig. 1 except that a circular wave guide 21 is utilized rather than a rectangular wave guide and the modes of propagation are orthogonally polarized $TE_{11}$ modes in circular guides. In this arrangement the laminal sheet 15 and the principles of operation are precisely the same as those described for Fig. 1.

It can be demonstrated mathematically that the laminal sheet 15 of Figs. 1 and 2 does indeed perturb the orthogonal mode to produce tangential field components of opposite sense and equal magnitude on opposite faces thereof, and thus a null planar tangential field component region. However, the mathematics is complicated and is not more informative nor persuasive than the dramatic experimentally demonstrated improved operation of a resistance sheet mode filter, in accordance with the invention, in a round wave guide (such as the embodiment of Fig. 2). A 15 to 1 decrease in the insertion loss for the orthogonal mode was achieved over the prior art. In a test situation at 55 kilomegacycles wherein the resistive film was cobalt evaporated on one face of a .0035-inch Mylar sheet to form the resistance sheet filter of the type in accordance with the prior art, a 3.0 db insertion loss for the orthogonal mode was the least that could be obtained. When, however, two Mylar sheets, each .002-inch thick, were sandwiched about the evaporated film of cobalt in accordance with the invention, a 0.2 db insertion loss for the orthogonal mode was achieved. The resistivity of the cobalt film in both cases was 100 ohms per square. The 2.8 db decrease in insertion loss was accomplished even though the total thickness of the two Mylar sheets was greater than the single thickness of the Mylar sheet utilized in accordance with the prior art.

Fig. 2 described above, is directed to the use of the $TE_{11}$ mode in circular guides. However, circular wave guides will support another very important electromagnetic mode configuration, namely the circular electric mode. The $TE_{01}$ mode is transverse electric having electric lines of force in the shape of concentric circles in the plane of the transverse dimension of the round guide. The principles of the invention are readily adapted to provide mode filters which will treat this type of mode configuration as the orthogonal mode to be passed without attenuation, while selectively attenuating modes having transverse electric field components other than circular and/or having any type of longitudinal electric components. This is readily accomplished in a circular guide 31 as shown in Fig. 3, by arranging a plurality of diametrally extending laminal sheets 32 through 35 in tandem along the guide with the plane of each laminal sheet being angularly offset from any next succeeding laminal sheet. The field components of the circular electric mode are always orthogonal to all the sheets and benefit from the low insertion loss provided by the invention (sheets 32 through 35 are precisely the same as sheets 15). The other modes mentioned above, however, are attenuated because of the tangential relation of their field components to the liminal sheets 32 through 35.

In all cases it is understood that the above-described arrangements are simply illustrative of a small number of the many specific embodiments which can represent applications of the principles of the invention. Numerous and varied other arrangements can readily be devised in accordance with these principles by those skilled in the art without departing from the spirit and scope of the invention.

What is claimed is:

1. For use in a microwave transmission system, a wave guide mode filter consisting of a wave guide adapted for the transmission of electromagnetic wave energy of a predetermined mode while supportive of electromagnetic wave energy of at least one other mode, a thin planar film of resistive material disposed parallel to electric field components of said other mode and orthogonal to all the electric field components of said predetermined mode, said planar film being disposed in said wave guide solely in the region of maximum electric field intensity of said other mode, said planar film being thinner than the minimum thickness necessary to render it physically self-supporting in said wave guide and very thin compared with a skin depth at the operating frequency of said microwave system, means for supporting said film by all-dielectric material having a total thickness in the direction parallel to the electric field components of said predetermined mode small compared to the parallel dimension of said wave guide, said supporting means comprising only a first lamination of all-dielectric material having one face thereof contiguous to one side of said film and a second all-dielectric lamination having one face thereof contiguous to the other side of said film, said first and second laminations having the same dielectric constant and having the same shape and dimensions in any given transverse cross-section and being in all respects mirror images of each other relative to said planar film, said laminations each having a thickness small compared to a wavelength at the operating frequency of said microwave system.

2. For use in a microwave transmission system, a wave guide mode filter comprising a wave guide adapted for the transmission of electromagnetic wave energy of a predetermined mode while supportive of electromagnetic wave energy of at least one other mode, and means for selectively attenuating at least said other mode and permitting transmission of said predetermined mode, said means comprising solely a laminal sheet structure of total thickness which is small compared to a wavelength at the operating frequency of said guide and having first and second dielectric sheets and a planar resistive film therebetween, said structure being disposed in said wave guide with the plane of the structure parallel to the electric field components of said other mode and orthogonal to the electric field components of said predetermined mode, said first dielectric sheet having a dielectric constant and thickness, said second dielectric sheet having a dielectric constant and thickness one of which differs from the corresponding quantity of said first dielectric sheet to provide a planar null of electric field components of said predetermined mode in the plane of said resistive film.

3. A wave guide mode filter comprising a wave guide adapted for the transmission of electromagnetic wave energy of a predetermined mode while supportive of electromagnetic wave energy of at least one other mode, and means for selectively attenuating said other mode and permitting transmission of said predetermined mode, said means comprising solely a laminal sheet structure of total thickness which is small compared to a wavelength at the operating frequency of said wave guide and having first and second dielectric sheets and a planar resistive film therebetween, said sheet structure being supported within said wave guide with the plane of the structure parallel to the electric field components of said other mode and orthogonal to the electric field components of said predetermined mode, the location of the sheet structure and the dielectric constants and thicknesses of said first and second sheets being interrelated to provide a planar null of electric field components of said predetermined mode in the plane of said resistive film.

References Cited in the file of this patent

UNITED STATES PATENTS

| | | |
|---|---|---|
| 2,602,828 | Norton | July 8, 1952 |
| 2,603,710 | Bowen | July 15, 1952 |

FOREIGN PATENTS

| | | |
|---|---|---|
| 671,206 | Great Britain | Apr. 30, 1952 |